(12) United States Patent
Kim et al.

(10) Patent No.: US 12,157,693 B2
(45) Date of Patent: Dec. 3, 2024

(54) METHOD OF MANUFACTURING WINDOW AND WINDOW MANUFACTURED BY THE SAME

(71) Applicants: Samsung Display Co., Ltd., Yongin-si (KR); DOWOOINSYS CO., LTD., Cheongju-si (KR)

(72) Inventors: Hyungsik Kim, Suwon-si (KR); Cheollae Roh, Seongnam-si (KR); Jang Doo Lee, Hwaseong-si (KR); Beomsoo Kim, Cheonan-si (KR); Hanggyun Park, Suwon-si (KR); Joongsung Lee, Hwaseong-si (KR); Woohyun Jung, Seoul (KR); Seungjun Yi, Suwon-si (KR); Hyungsup Lee, Yongin-si (KR); Sunhong Choi, Cheonan-si (KR)

(73) Assignees: Samsung Display Co., Ltd., Yongin-si (KR); Dowooinsys Co., Ltd., Cheongju-si (KR)

( * ) Notice: Subject to any disclaimer, the term of this patent is extended or adjusted under 35 U.S.C. 154(b) by 85 days.

(21) Appl. No.: 17/715,547

(22) Filed: Apr. 7, 2022

(65) Prior Publication Data
US 2022/0348492 A1 Nov. 3, 2022

(30) Foreign Application Priority Data
Apr. 29, 2021 (KR) ........................ 10-2021-0055528

(51) Int. Cl.
*C03B 33/023* (2006.01)
*B23K 26/06* (2014.01)
(Continued)

(52) U.S. Cl.
CPC ........ *C03B 33/023* (2013.01); *B23K 26/0608* (2013.01); *B23K 26/38* (2013.01);
(Continued)

(58) Field of Classification Search
None
See application file for complete search history.

(56) References Cited

U.S. PATENT DOCUMENTS 10,261,218 B2  4/2019  Ahn
2016/0002103 A1* 1/2016 Wang ................. B23K 26/0624
428/141

(Continued)

FOREIGN PATENT DOCUMENTS

| KR | 10-1661278 B1 | 9/2016 |
| KR | 10-1684344 B1 | 12/2016 |
| KR | 10-2018-0056355 A | 5/2018 |

*Primary Examiner* — Allan W. Olsen
(74) *Attorney, Agent, or Firm* — Lewis Roca Rothgerber Christie LLP

(57) ABSTRACT

A method of manufacturing a window and a window manufactured by the same are provided. A method of manufacturing a window includes laser cutting a base glass into a preliminary window using first laser light, irradiating, with second laser light, a point spaced apart from an edge of the preliminary window at a first distance, and providing a window including a flat portion and an edge portion by wet etching the preliminary window irradiated with the second laser light. A method of manufacturing a window having a chamfer shape at the edge portion is facilitated.

14 Claims, 10 Drawing Sheets

(51) Int. Cl.
  *B23K 26/38*    (2014.01)
  *B23K 26/402*   (2014.01)
  *C03B 33/02*    (2006.01)
  *C03C 15/00*    (2006.01)
  *B23K 103/00*   (2006.01)

(52) U.S. Cl.
  CPC ........ *B23K 26/402* (2013.01); *C03B 33/0222* (2013.01); *C03C 15/00* (2013.01); *B23K 2103/54* (2018.08)

(56) References Cited

U.S. PATENT DOCUMENTS

2016/0059349 A1* 3/2016 Sercel ................. B23K 26/402
                                                      65/32.1
2022/0132677 A1* 4/2022 Breymesser ......... H05K 1/0306
2022/0193825 A1* 6/2022 Van Dyke ............ B23K 26/402
2022/0281768 A1* 9/2022 Kim ..................... C03B 33/091

* cited by examiner

METHOD OF MANUFACTURING WINDOW AND WINDOW MANUFACTURED BY THE SAME

CROSS-REFERENCE TO RELATED APPLICATION

This application claims priority to and the benefit of Korean Patent Application No. 10-2021-0055528, filed on Apr. 29, 2021 in the Korean Intellectual Property Office, the entire content of which is hereby incorporated by reference.

BACKGROUND

1. Field

Aspects of embodiments of the present disclosure relate to a method of manufacturing a window and a window manufactured by the same.

2. Description of the Related Art

Electronic devices include a window, a housing, and an electronic element. The electronic element may include various types of elements activated according to electrical signals, such as a display element, a touch element, or a detection element.

The window protects the electronic element and provides active areas to a user. Accordingly, the user may provide inputs to the electronic element or receive information generated in the electronic element through the window. In addition, the electronic element may be stably protected from external shocks through the window.

In line with the current trend for slimness in electronic devices, the window is also required to be light and thin, and, a method of manufacturing a window having a form that overcomes the resulting structural vulnerability has been studied.

SUMMARY

According to aspects of embodiments of the present disclosure, a method of manufacturing a window using laser light, and a window manufactured by the same are provided.

According to an aspect of embodiments of the present disclosure, a method of manufacturing a window that facilitates processing of a window having a chamfer-shaped edge is provided.

According to another aspect of embodiments of the present disclosure, a window having an edge portion with improved strength is provided.

According to one or more embodiments of the inventive concept, a method of manufacturing a window includes laser cutting a base glass into a preliminary window using first laser light, irradiating, with second laser light, a point spaced apart from an edge of the preliminary window at a first distance (e.g., a predetermined distance), and providing a window including a flat portion and an edge portion by wet etching the preliminary window irradiated with the second laser light.

In an embodiment, the first laser light may have greater energy than the second laser light.

In an embodiment, the energy of the second laser light may be about 50% to about 80% of the energy of the first laser light.

In an embodiment, the first laser light and the second laser light may be infrared laser light.

In an embodiment, the first laser light and the second laser light may each have a beam size of about 1 μm to about 5 μm.

In an embodiment, the first distance may be about 10% to about 20% of a thickness of the preliminary window.

In an embodiment, the thickness of the preliminary window may be about 20 μm to about 50 μm.

In an embodiment, the first distance may be about 2 μm to about 5 μm.

In an embodiment, the thickness of the preliminary window and the thickness of the window may have a relationship according to the following Equation 1, where, in Equation 1, $W_{RA}$ indicates the first distance, $t_{P\_WP}$ indicates the thickness of the preliminary window, and $t_{WP}$ indicates a thickness of the flat portion.

$$t_{WP} = t_{P\_WP} - (2W_{RA}) \qquad \text{Equation 1}$$

In an embodiment, the edge portion may have a width less than the first distance.

In an embodiment, the edge portion may include an edge portion side surface formed from the second laser light and including a laser irradiation line extending in a thickness direction of the window.

In an embodiment, the edge portion may be at an outer side of the flat portion, and may have a decreasing thickness in a direction away from the flat portion.

In an embodiment, the providing the window may include wet etching such that the edge portion includes an edge upper surface and an edge lower surface facing away from each other, wherein the edge upper surface includes a curved surface concave in a direction toward the edge lower surface, and the edge lower surface includes a curved surface concave in a direction toward the edge upper surface.

In an embodiment, the second laser light irradiation may include irradiating, with the second laser light, a first portion spaced apart from the edge of the cut preliminary window at the first distance, and a second portion spaced apart from the edge of the preliminary window at a second distance.

In an embodiment, the providing the window may include wet etching such that the edge portion includes an edge upper surface and an edge lower surface facing away from each other, wherein the edge upper surface may include a first sub upper surface and a second sub upper surface that are concave in a direction toward the edge lower surface and have different radii of curvature, and the edge lower surface may include a first sub lower surface and a second sub lower surface that are concave in a direction toward the edge upper surface and have different radii of curvature.

According to one or more embodiments of the inventive concept, a window includes a flat portion, and an edge portion at an outer side of the flat portion and having a gradually decreasing thickness in a direction away from the flat portion, wherein an exposed edge portion side surface of the edge portion includes a laser irradiation line extending in a thickness direction.

In an embodiment, the edge portion may include an edge upper surface and an edge lower surface between the flat portion and the edge portion side surface, and facing away from each other, wherein the edge upper surface may include a curved surface concave in a direction toward the edge lower surface, and the edge lower surface may include a curved surface concave in a direction toward the edge upper surface.

In an embodiment, the edge upper surface and the edge lower surface may be symmetrical with respect to a virtual line passing through a center of the edge portion side surface.

In an embodiment, the edge portion may include an edge upper surface and an edge lower surface facing away from each other, wherein the edge upper surface may include a first sub upper surface and a second sub upper surface that are concave in a direction toward the edge lower surface and have different radii of curvature, and the edge lower surface may include a first sub lower surface and a second sub lower surface that are concave in a direction toward the edge upper surface and have different radii of curvature.

In an embodiment, the edge upper surface and the edge lower surface may each include an inflection portion.

BRIEF DESCRIPTION OF THE FIGURES

The accompanying drawings are included to provide a further understanding of the inventive concept, and are incorporated in and constitute a part of this specification. The drawings illustrate some embodiments of the inventive concept and, together with the description, serve to explain principles of the inventive concept. In the drawings.

DETAILED DESCRIPTION

Figure 1:
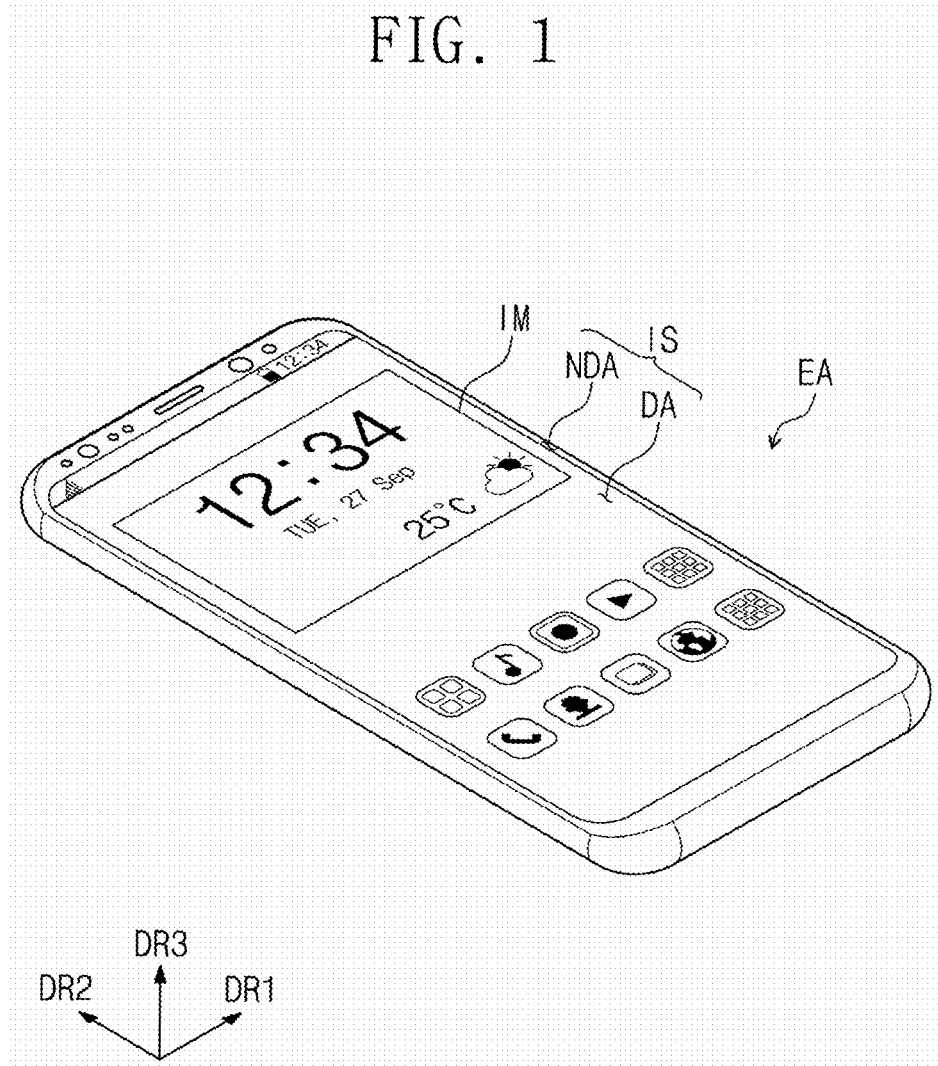
FIG. 1 is a perspective view of an electronic device according to an embodiment.

The inventive concept may be modified in many alternate forms, and thus some example embodiments will be illustrated in the drawings and described in further detail. It is to be understood, however, that the description is not intended to limit the inventive concept to the particular forms disclosed, but, rather, is intended to cover all modifications, equivalents, and alternatives falling within the spirit and scope of the present invention.

In the present description, when an element (or a region, a layer, a portion, etc.) is referred to as being "on," "connected to," or "coupled to" another element, it means that the element may be directly disposed on, connected to, or coupled to the other element, or that one or more third elements may be disposed therebetween.

In the present description, "directly disposed" may indicate that there is no layer, film, region, plate, or the like added between a portion of a layer, a film, a region, a plate, or the like, and other portions. For example, "directly disposed" may indicate disposing without additional members such as an adhesive member between two layers or two members.

Like reference numerals refer to like elements. Also, in the drawings, the thickness, the ratio, and/or the dimensions of elements may be exaggerated for purposes of description or illustration of technical contents.

The term "and/or" includes all combinations of one or more of which associated configurations may define.

It is to be understood that, although the terms "first," "second," etc. may be used herein to describe various elements, these elements should not be limited by these terms. These terms are used to distinguish one element from another. For example, a first element could be termed a second element, and, similarly, a second element could be termed a first element, without departing from the scope of example embodiments of the inventive concept. The terms of a singular form may include plural forms unless the context clearly indicates otherwise.

In addition, terms such as "below," "lower," "above," "upper," and the like are used to describe the relationship of the configurations shown in the drawings. The terms are used as a relative concept and are described with reference to the direction indicated in the drawings. In the present description, it is to be understood that when an element is referred to as "disposed on," it may also be disposed above or under the other element.

Unless otherwise defined, all terms (including technical and scientific terms) used herein have the same meaning as commonly understood by one of ordinary skill in the art to which the inventive concept pertains. It is also to be understood that terms defined in commonly used dictionaries should be interpreted as having meanings consistent with the meanings in the context of the related art, and are expressly defined herein unless they are interpreted in an ideal or overly formal sense.

It is to be understood that the terms "comprise" or "have" are intended to specify the presence of stated features, integers, steps, operations, elements, components, or combinations thereof in the disclosure, but do not preclude the presence or addition of one or more other features, integers, steps, operations, elements, components, or combinations thereof.

Herein, a method of manufacturing a window, and a window, according to some embodiments of the inventive concept will be described with reference to the accompanying drawings.

Figure 2:
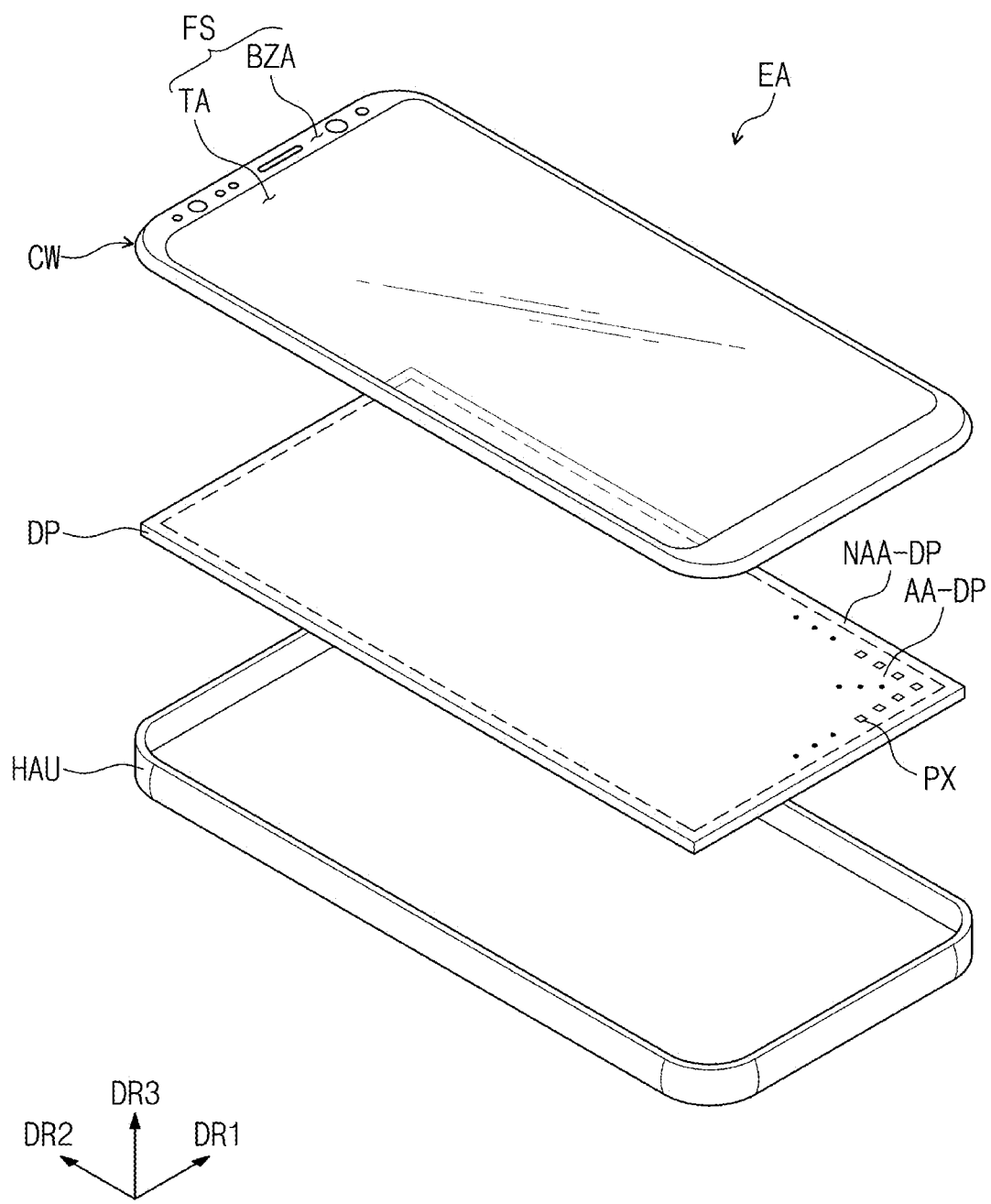
FIG. 2 is an exploded perspective view of the electronic device shown in FIG. 1.
Figure 3:
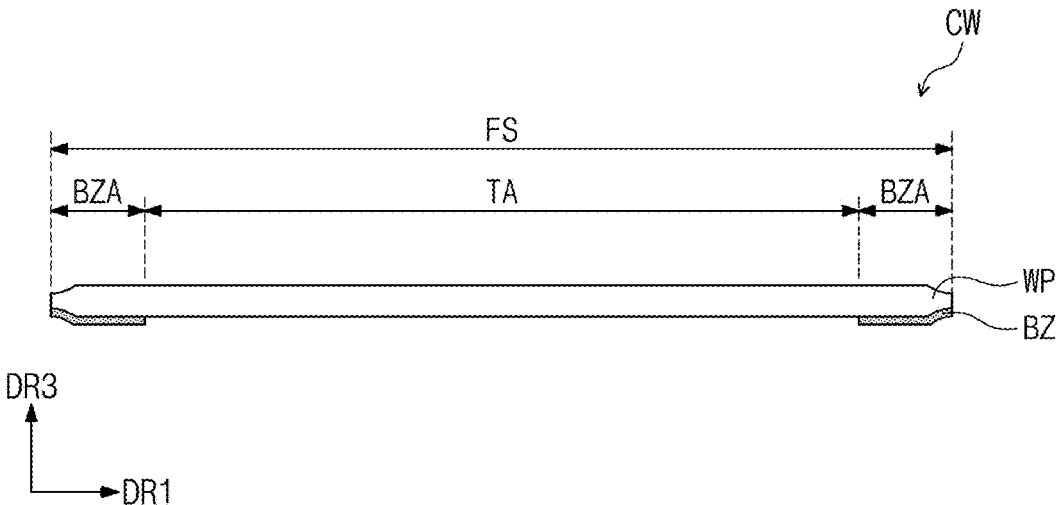
FIG. 3 is a cross-sectional view showing a cover window according to an embodiment.

FIG. 1 is a perspective view showing an electronic device according to an embodiment; and FIG. 2 is an exploded perspective view of the electronic device shown in FIG. 1. FIG. 3 is a cross-sectional view of a cover window according to an embodiment. FIG. 1 is a view showing an embodiment of an electronic device including a window manufactured through a method of manufacturing a window according to an embodiment; and FIG. 3 is a cross-sectional view of a cover window including a window manufactured through a method of manufacturing a window according to an embodiment.

An electronic device EA may be a device activated in response to electrical signals. The electronic device EA may include various embodiments. For example, the electronic device EA may include a tablet, a laptop, a computer, a smart television, etc. In the present embodiment, a smartphone is illustratively shown as the electronic device EA.

The electronic device EA may display an image IM towards a third directional axis DR3 on a display surface IS parallel to a plane defined by a first directional axis DR1 and a second directional axis DR2. The display surface IS on which the image IM is displayed may correspond to a front surface of the electronic device EA and may correspond to a front surface FS of a cover window CW. In addition, the electronic device EA may have a three-dimensional shape with a thickness (e.g., a predetermined thickness) in a direction of the third directional axis DR3, which is a direction perpendicular to a plane defined by the first directional axis DR1 and the second directional axis DR2. In an embodiment, although not shown, the electronic device EA may be a flexible electronic device that is foldable or bendable with respect to a virtual folding axis (or bending axis) extending in a direction.

In the electronic device EA of an embodiment shown in FIG. 1, the display surface IS may include a display area DA and a non-display area NDA adjacent to the display area DA. The non-display area NDA is shown to be disposed surrounding the display area DA, but embodiments of the inventive concept are not limited thereto. The display area DA is a portion in which the image IM is provided and may be a portion corresponding to an active area AA-DP of an electronic panel DP. The image IM may include a still image as well as a dynamic image. FIG. 1 shows watch windows and icons as an example of the image IM.

In the present embodiment, an upper surface (or a front surface) and a lower surface (or a rear surface) of respective members are defined with respect to a direction in which the image IM is displayed. The upper surface and the lower surface may oppose each other with respect to the third directional axis DR3 and a normal direction of each of the upper and lower surfaces may be parallel to the third directional axis DR3. However, the directions indicated by the first to third directional axes DR1, DR2, and DR3 are relative concepts, and may thus be changed to other directions. Herein, first to third directions correspond to directions indicated by the first to third directional axes DR1, DR2, and DR3, respectively, and are given the same reference numerals.

The electronic device EA includes a cover window CW, an electronic panel DP, and a housing HAU. In the electronic device EA according to an embodiment shown in FIGS. 1 and 2, the cover window CW and the housing HAU may combine together to form an exterior of the electronic device EA.

The electronic panel DP may be a device activated in response to electrical signals. In the present embodiment, the electronic panel DP is activated to display the image IM on the display surface IS of the electronic device EA. The image IM is provided to a user through a transmission area TA, and the user may receive information through the image IM. However, this is shown as an example, and the electronic panel DP may be activated to detect external inputs applied to an upper surface thereof. The external inputs may include a user's touch, contact or proximity of intangible objects, pressure, light, or heat, and are not limited to any particular embodiment.

That is, the display panel DP may include the active area AA-DP and a peripheral area NAA-DP. The active area AA-DP may be an area providing the image IM. The peripheral area NAA-DP is adjacent to the active area AA-DP. In an embodiment, the peripheral area NAA-DP may surround the active area AA-DP. A driving circuit or driving wiring for driving the active area AA-DP may be disposed in the peripheral area NAA-DP.

The electronic panel DP may include a plurality of pixels PX. The pixels PX display light in response to electrical signals. The light displayed by the pixels PX implements the image IM. The pixels PX may include a display element. For example, the display element may be an organic light emitting element, a quantum dot light emitting element, a liquid crystal capacitor, an electrophoretic element, or an electrowetting element.

The cover window CW may include a window WP manufactured using a method of manufacturing a window according to an embodiment. The window WP is manufactured through a method of manufacturing a window according to an embodiment, which will be described later, and may include a flat portion MP (see FIG. 9A), and an edge portion EP (see FIG. 9A) disposed at an outer side of the flat portion MP and having a curved surface.

In an embodiment, the window WP included in the cover window CW may be a tempered glass substrate. The cover window CW may include a window WP, and a bezel layer BZ disposed on a surface of the window WP. In an embodiment, the bezel layer BZ may be formed on a lower surface of the window WP through printing or deposition. In another embodiment, the bezel layer BZ may be bonded to a surface of the window WP through a separate adhesive member or the like.

The upper surface FS of the cover window CW, as described above, defines the upper surface of the electronic device EA. The upper surface FS of the cover window CW may include the transmission area TA and a bezel area BZA. In an embodiment, the bezel layer BZ may be disposed on a lower surface of the window WP to define the bezel area BZA.

The transmission area TA may be an optically transparent area. The bezel area BZA may be an area having a relatively lower light transmittance than the transmission area TA. The bezel area BZA may define a shape of the transmission area TA. In an embodiment, the bezel area BZA may be adjacent to the transmission area TA and surround the transmission area TA.

The bezel area BZA may have a color (e.g., a predetermined color). The bezel area BZA may cover a peripheral area NAA-DP of the electronic panel DP to prevent or substantially prevent the peripheral area NAA-DP from being viewed from an outer side thereof. However, this is shown as an example, and, in the cover window CW according to an embodiment of the present invention, the bezel area BZA may be omitted.

The transmission area TA of the cover window CW may overlap at least a portion of the electronic panel active area AA-DP. The electronic panel peripheral area NAA-DP may be an area covered by the bezel area BZA.

The housing HAU may be disposed below the electronic panel DP. The housing HAU may include a material having a relatively higher rigidity. For example, the housing HAU may include a plurality of frames and/or plates formed of glass, plastic, or metal. The housing HAU provides an accommodation portion. The electronic panel DP may be accommodated in the accommodation portion to be protected from external shocks.

Referring to FIG. 3, the cover window CW according to an embodiment may include a window WP having a chamfer shape at an edge portion. The bezel layer BZ may be disposed on a surface of the window WP, including a portion having a chamfer shape. The window WP used in the cover window CW according to an embodiment shown in FIG. 3 is shown to have a flat shape, but embodiments are not limited thereto, and the window WP may include at least one bending portion or at least one folding portion, and may thus be folded.

Figure 4:
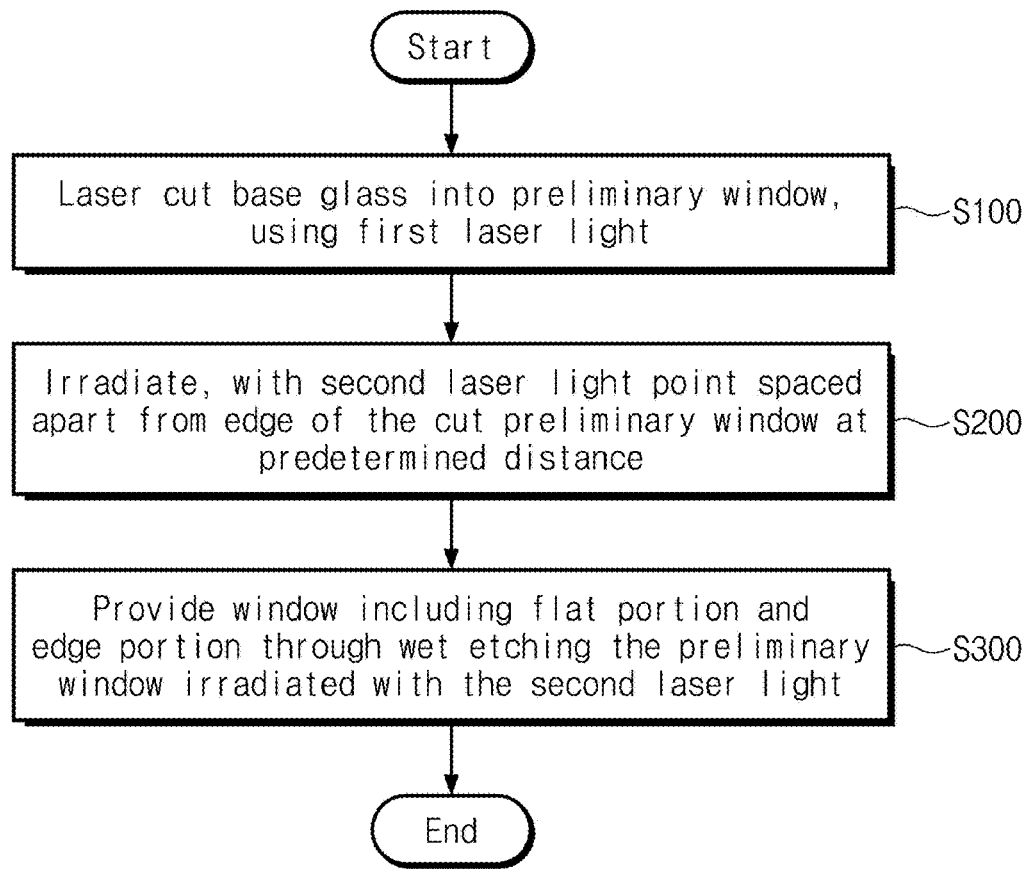
FIG. 4 is a flowchart showing a method of manufacturing a window according to an embodiment.

FIG. 4 is a flowchart showing a method of manufacturing a window according to an embodiment; and FIGS. 5 to 8 are views each showing a process in a method of manufacturing a window according to an embodiment as an example.

Referring to FIG. 4, a method of manufacturing a window according to an embodiment may include laser cutting a base glass into a preliminary window using first laser light (S100), irradiating using second laser light (S200), and providing a window including a flat portion and an edge portion through wet etching (S300).

Figure 5:
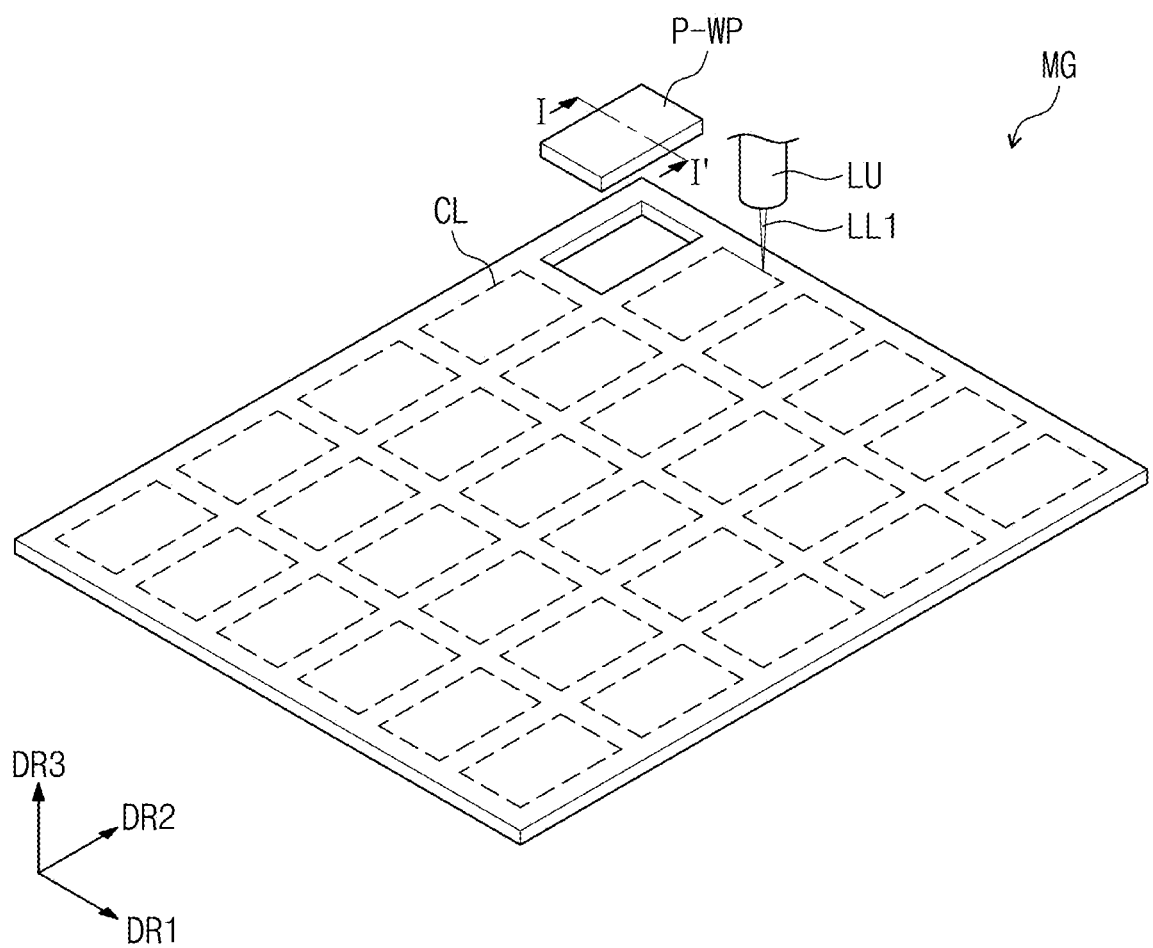
FIG. 5 is a view showing a process in a method of manufacturing a window according to an embodiment.

FIG. 5 shows the laser cutting (S100) in the method of manufacturing a window according to an embodiment. FIGS. 6A to 7B schematically show the second laser light irradiation (S200) in the method of manufacturing a window according to an embodiment. FIG. 8 schematically shows the wet etching of a preliminary window irradiated with second laser light to provide a window including a flat portion and an edge portion (S300).

In the method of manufacturing a window according to an embodiment, the laser cutting (S100) may be laser cutting of a base glass MG into a preliminary window P-WP.

The base glass MG may be a mother glass or a glass substrate having a size that may be processed into a plurality of windows. In an embodiment, the base glass MG may be an ultra-thin glass substrate. For example, the base glass MG may have a thickness of about 20 μm to about 50 μm.

Irradiation of first laser light LL1 provided in a laser light unit LU may be applied to the base glass MG, which may be cut into a plurality of preliminary windows P-WP. The irradiation of the first laser light LL1 may be applied along a cutting line CL to be cut into a preliminary window P-WP having a size and a shape, which may be processed into the window WP (see FIG. 3).

Figure 6A:
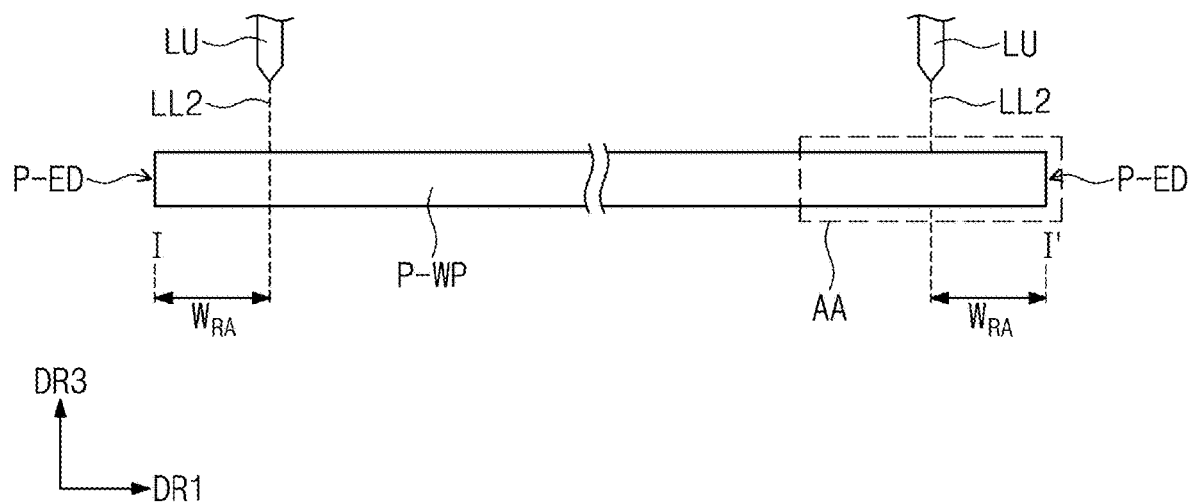
FIG. 6A is a cross-sectional view showing a process in a method of manufacturing a window according to an embodiment.
Figure 6B:
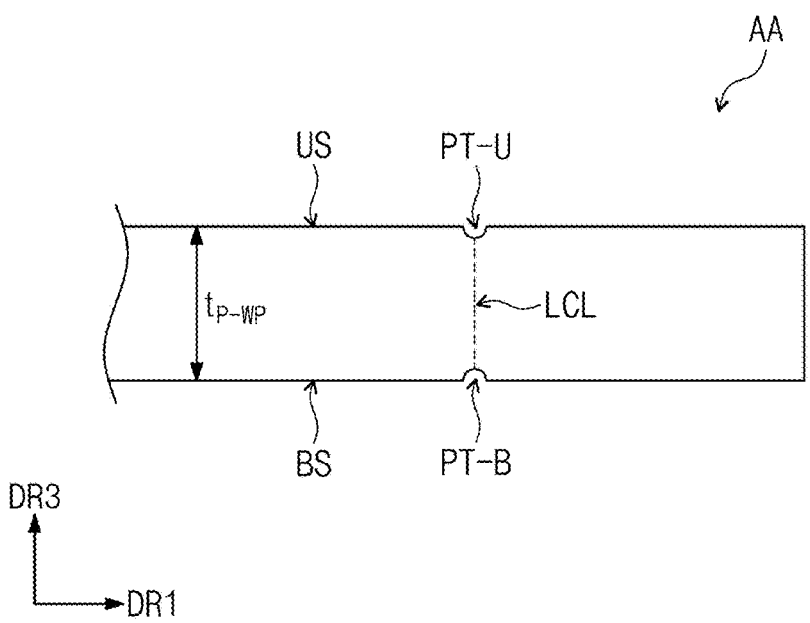
FIG. 6B is a cross-sectional view showing a region "AA" of a preliminary window in a method of manufacturing a window according to an embodiment.

FIG. 6A is a cross-sectional view schematically showing the second laser light irradiation (S200); and FIG. 6B is a cross-sectional view showing a region "AA" of a preliminary window irradiated with second laser light. FIG. 6A is a cross-sectional view of a portion corresponding to the line I-I' of the preliminary window cut in FIG. 5; and FIG. 6B is a view showing the region "AA" of FIG. 6A.

The second laser light irradiation (S200) may indicate irradiating, with second laser light LL2, a point spaced apart from an edge P-ED of the preliminary window P-WP cut in the laser cutting (S100) at a first distance $W_{RA}$, which is a distance (e.g., a predetermined distance).

In the method of manufacturing a window according to an embodiment, the first laser light LL1 and the second laser light LL2 may be infrared laser light (IR laser light). In an embodiment, the energy of the second laser light LL2 may be less than the energy of the first laser light LL1 used in the laser cutting (S100).

The first laser light LL1 may have energy cutting the whole base glass MG into the shape of the preliminary window P-WP out of the base glass MG. In an embodiment, the second laser light LL2 causes fine cracks to form in a portion of the preliminary window P-WP, and may have an energy of about 50% to about 80% of the energy of the first laser light LL1.

Irradiation of the second laser light LL2 may be applied through the preliminary window P-WP. Grooves PT-U and PT-B may be formed in at least one of an upper surface US and a lower surface BS of the preliminary window P-WP at the point where the second laser light LL2 irradiation is applied. However, embodiments are not limited thereto, and fine cracks may be formed in the upper surface US and the lower surface BS of the preliminary window P-WP at the point where the second laser light LL2 irradiation is applied, or grooves or cracks may not be visually observed on the upper surface US and the lower surface BS of the preliminary window P-WP at the point where the second laser light LL2 irradiation is applied.

In an embodiment, the second laser light LL2 may be provided on the upper surface US of the preliminary window P-WP, and the second laser light LL2 may be transmitted to the lower surface BS through the preliminary window P-WP. A laser irradiation line LCL may be formed inside the preliminary window P-WP through the second laser light LL2.

In an embodiment, the first laser light LL1 and the second laser light LL2 may each have a beam size of about 1 μm to about 5 μm. The beam size of the laser light may correspond to a diameter at a point where the energy of the applied laser light is maximum.

In an embodiment, the first laser light LL1 may have an energy of about 30 μJ to 100 μJ, and the second laser light LL2 may be about 50% to about 80% of about 30 μJ to about 100 μJ of energy used for cutting a glass substrate.

In an embodiment, in the laser cutting (S100), the first laser light LL1 may be provided with an energy of about 30 μJ to about 100 μJ for a pulse duration of about 5 ps (picoseconds) to about 10 ps. In an embodiment, the second laser light LL2 may be provided in the second laser light irradiation (S200) with an energy of about 50% to about 80% of the energy of the first laser light LL1 provided in the laser cutting (S100) for a pulse duration of about 0.3 ps to about 10 ps.

In the method of manufacturing a window according to an embodiment, using the first laser light LL1, the base glass MG is cut into a size of the preliminary window P-WP, and using the second laser light LL2 having less energy than the first laser light LL1, a laser irradiation line LCL (see FIG. 10B) may be formed in a portion adjacent to the edge P-ED of the preliminary window. A surface including the laser irradiation line may correspond to an edge portion side surface ED (see FIG. 9B) of the window manufactured afterward. That is, in the method of manufacturing a window according to an embodiment, laser light irradiation is additionally applied to a portion adjacent to the edge of the cut preliminary window, thereby facilitating formation of the edge portion of the window through wet etching.

In an embodiment, the preliminary window P-WP may have a thickness $t_{P\text{-}WP}$ of about 20 μm to about 50 μm. The thickness $t_{P\text{-}WP}$ of the preliminary window P-WP may correspond to the thickness of the base glass MG of FIG. 5. In an embodiment, the preliminary window P-WP is an ultra-thin glass substrate which is thin in thickness and may be processed to correspond to the shape of any of electronic devices having various shapes.

The second laser light LL2 may be provided at a point spaced apart from the edge P-ED of the preliminary window P-WP at the first distance $W_{RA}$. In an embodiment, the first distance $W_{RA}$ may be about 10% to about 20% of the preliminary window thickness $t_{P\text{-}WP}$. For example, the point to which the second laser light LL2 irradiation is applied may be a point spaced apart from the edge P-ED of the preliminary window P-WP by about 2 μm to about 5 μm.

FIG. 6A shows a cross-section of the preliminary window P-WP parallel to a cross-section defined by the first directional axis DR1 and the third directional axis DR3, and shows a portion corresponding to a short side direction of the cut preliminary window P-WP shown in FIG. 5. However, embodiments are not limited thereto, and the second laser light LL2 irradiation may be applied to a portion spaced apart from the edge of the preliminary window P-WP at a distance (e.g., a predetermined distance) even in a portion corresponding to a long side direction of the preliminary window P-WP, and then the portion may be processed into the edge portion EP (see FIG. 9A) through wet etching.

Figure 7A:
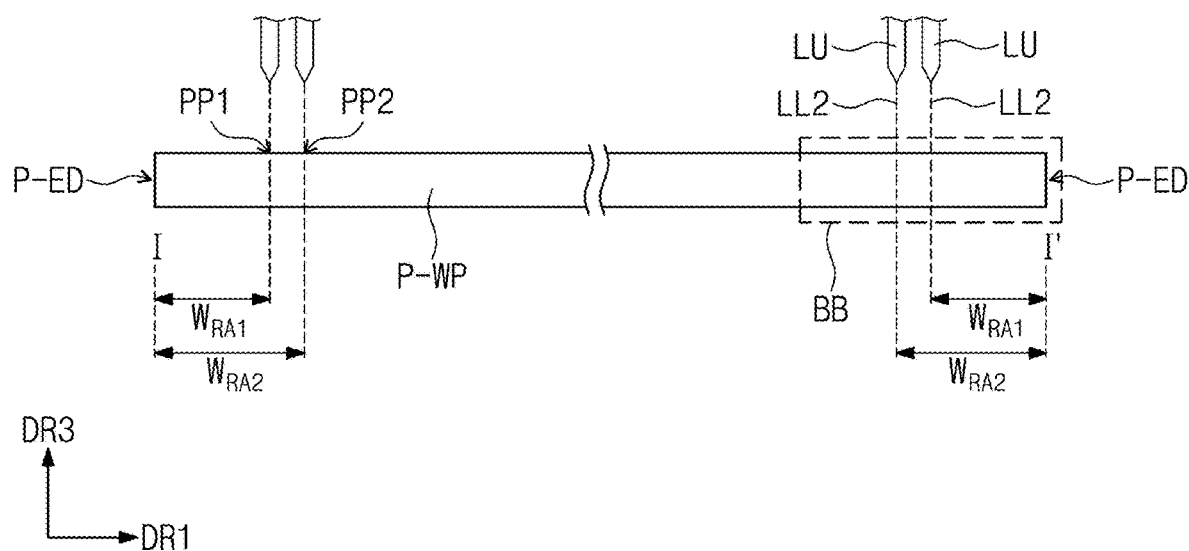
FIG. 7A is a cross-sectional view showing a process in a method of manufacturing a window according to an embodiment.
Figure 7B:
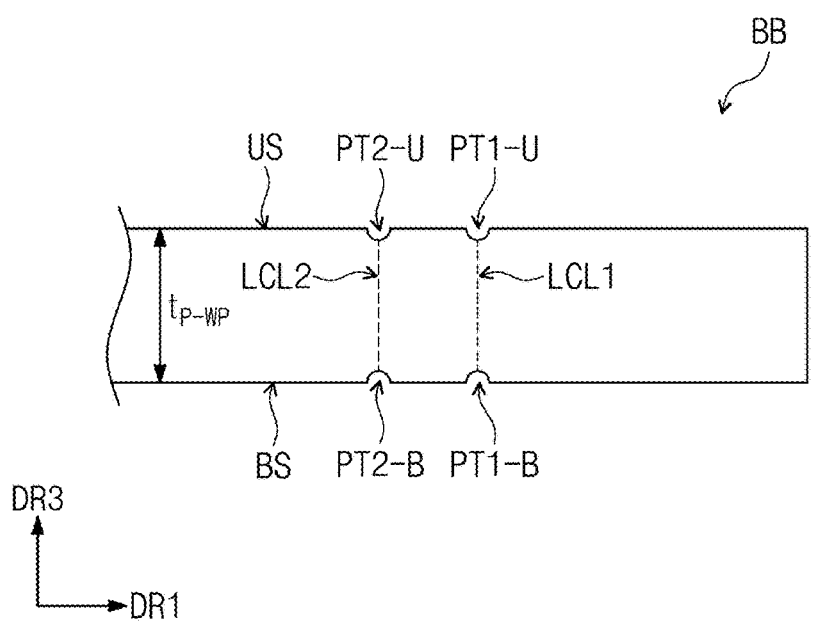
FIG. 7B is a cross-sectional view showing a region "BB" of a preliminary window in a method of manufacturing a window according to an embodiment.
Figure 8:
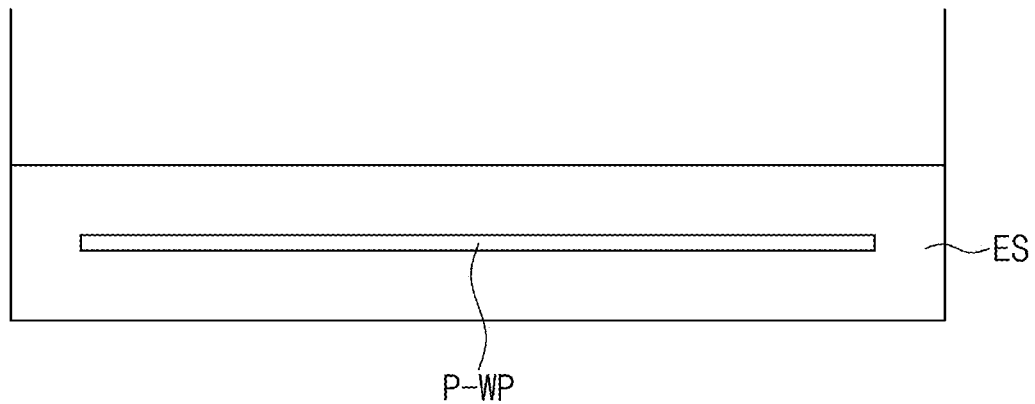
FIG. 8 is a view showing a process in a method of manufacturing a window according to an embodiment.

FIG. 7A is a cross-sectional view schematically showing an embodiment of the second laser light irradiation (S200); and FIG. 7B is a cross-sectional view showing a region "BB" of a preliminary window irradiated with second laser light. FIG. 7A may be a cross-sectional view of a portion corresponding to the line I-I' of the preliminary window cut in FIG. 5; and FIG. 7B is a view showing the region "BB" of FIG. 7A.

FIGS. 7A and 7B show a case in which there are a plurality of portions irradiated with the second laser light LL2 in a side of the preliminary window P-WP compared with the process of the embodiment shown in FIGS. 6A and 6B. The same descriptions as those described with reference to FIGS. 6A and 6B may be applied, except that there are a plurality of portions adjacent to a side of the preliminary window P-WP and irradiated with the second laser light LL2.

The second laser light irradiation (S200) may include irradiating, with the second laser light LL2, a first portion PP1 spaced apart from the edge P-ED of the preliminary window at a first distance $W_{RA1}$ and a second portion PP2 spaced apart from the edge P-ED of the preliminary window at a second distance $W_{RA2}$. In an embodiment, the second laser light LL2 may be sequentially provided to the first portion PP1 and the second portion PP2. In another embodiment, the second laser light LL2 may be concurrently provided both to the first portion PP1 and the second portion PP2.

In an embodiment, the second laser light LL2 provided to the first portion PP1 and the second portion PP2 may have energy which is about 50% to about 80% of the energy of the first laser light LL1. The energy of the second laser light LL2 provided to the first portion PP1 and the second portion PP2 may be the same as or different from each other.

In an embodiment, the first distance $W_{RA1}$ may be about 10% to about 20% of the preliminary window thickness $t_{P\text{-}WP}$. For example, the first portion PP1 irradiated with the second laser light LL2 may be a point spaced apart from the edge P-ED of the preliminary window P-WP by about 2 μm to about 5 μm. In an embodiment, the second distance $W_{RA2}$ may be equal to or less than twice the first distance $W_{RA1}$.

The irradiation of the second laser light LL2 may be applied through the preliminary window P-WP in the first portion PP1 and the second portion PP2. In an embodiment, grooves PT1-U, PT2-U, PT1-B, and PT2-B may be formed in at least one of an upper surface US and a lower surface BS of the preliminary window P-WP at the first and second portions PP1 and PP2 irradiated with the second laser light LL2. However, embodiments are not limited thereto, and fine cracks may be formed in the upper surface US and the lower surface BS of the preliminary window P-WP at the point irradiated with the second laser light LL2, or grooves or cracks may not be visually observed on the upper surface US and the lower surface BS of the preliminary window P-WP at the point irradiated with the second laser light LL2.

In an embodiment, the second laser light LL2 may be provided from the upper surface US of the preliminary window P-WP, and the second laser light LL2 passes through the preliminary window P-WP and is transmitted to the lower surface BS. Laser irradiation lines LCL1 and LCL2 may be formed inside the preliminary window P-WP by the second laser light LL2.

A surface including the first laser irradiation line LCL1 of the second laser light LL2 applied to the first portion PP1 may correspond to an edge portion side surface ED-a of the window WP-a (see FIGS. 11A and 11B) manufactured afterward. In addition, a surface including the second laser irradiation line LCL2 of the second laser light LL2 applied to the second portion PP2 may correspond to an inflection portion IP (see FIG. 11B) of the window edge portion EP-a (see FIG. 11B) manufactured afterward.

The method of manufacturing a window according to an embodiment may include providing a window including a flat portion and an edge portion through wet etching (S300). The providing of a window including a flat portion and an edge portion (S300) may include wet etching the preliminary window P-WP irradiated with the second laser light LL2 to process windows WP and WP-a (see FIGS. 9A and 11A) to have a flat portion MP (see FIGS. 9A and 11A) and an edge portion EP and EP-a (see FIGS. 9A and 11A).

FIG. 8 shows a process of wet etching a preliminary window irradiated with the second laser light LL2 as an example. The preliminary window P-WP irradiated with the second laser light LL2 may be immersed in an etching solution ES. In an embodiment, although not shown in the drawings, the preliminary window P-WP irradiated with the second laser light LL2 may be seated on a cassette (not shown) and immersed in the etching solution ES. A plurality of preliminary windows P-WP irradiated with the second laser light may be loaded in the cassette (not shown).

Concentration of the etching solution ES, duration of the wet etching process in the etching solution ES, and the like may be adjusted in consideration of an edge portion shape required for the window provided afterward.

Figure 9A:
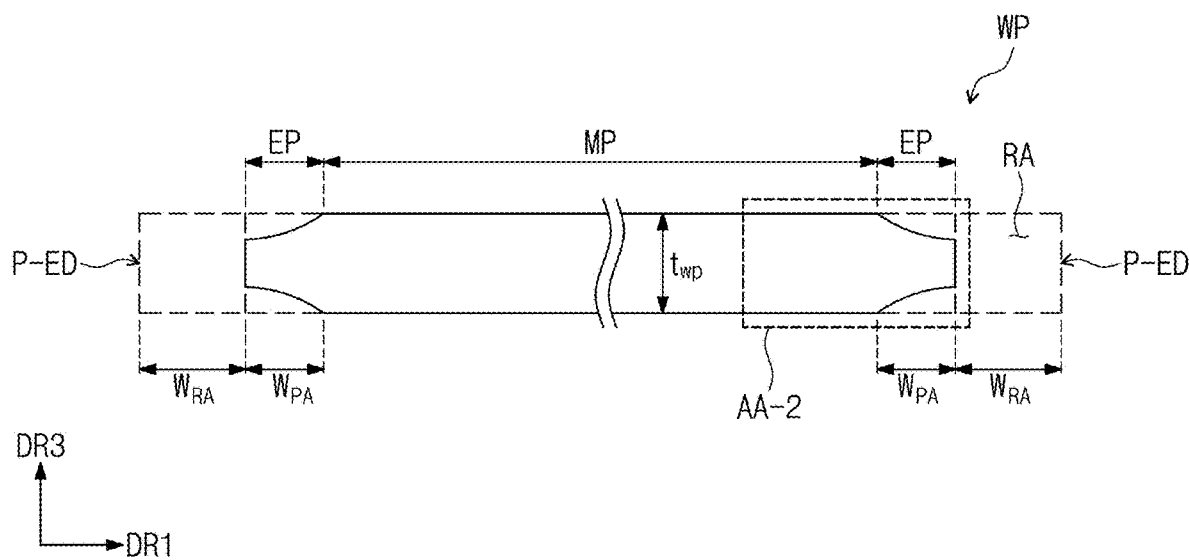
FIG. 9A is a cross-sectional view showing a window according to an embodiment.
Figure 9B:
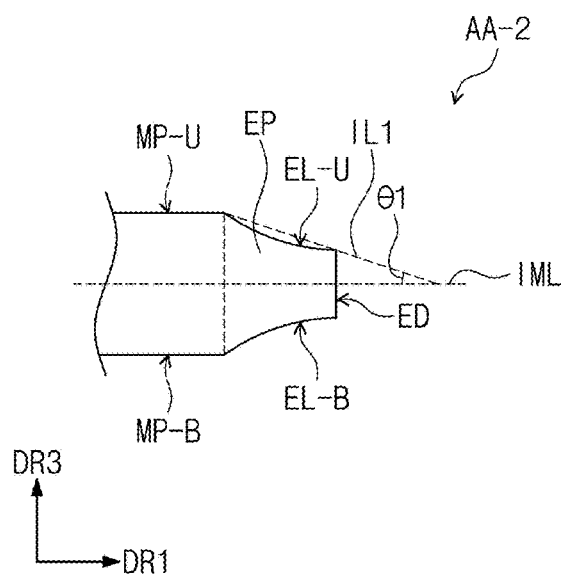
FIG. 9B is a cross-sectional view showing a region "AA-2" of the window of FIG. 9A.
Figure 10A:
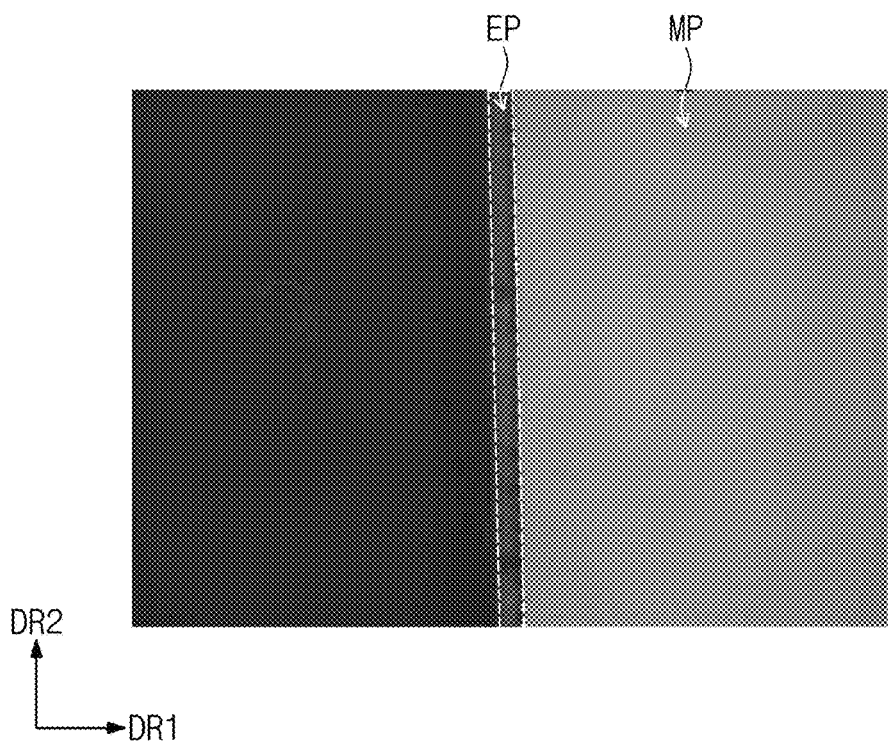
FIG. 10A is a planar image of a window according to an embodiment.
Figure 10B:
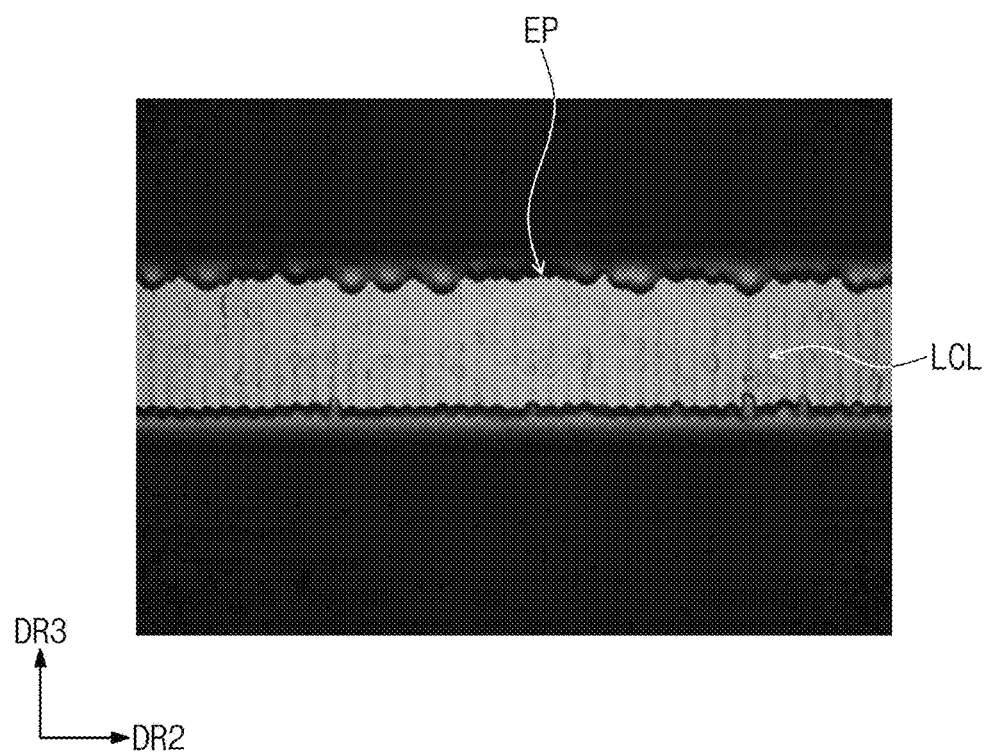
FIG. 10B is a cross-sectional image of a window according to an embodiment.

FIG. 9A is a cross-sectional view showing a window WP according to an embodiment, manufactured by wet etching a preliminary window irradiated with second laser light; and FIG. 9B is an enlarged cross-sectional view of a region "AA-2" of FIG. 9A. FIGS. 9A and 9B are views showing an embodiment of a window manufactured from the preliminary window P-WP shown in FIGS. 6A and 6B described above. FIG. 10A is a planar image of the window according to an embodiment shown in FIGS. 9A and 9B; and FIG. 10B is an image showing an exposed edge portion side surface of the window.

Referring to FIGS. 9A to 10B, the window WP manufactured by wet etching the preliminary window irradiated with the second laser light may include a flat portion MP and an edge portion EP. The edge portion EP may be disposed at an outer side of the flat portion MP.

The flat portion MP of the window WP may be a portion corresponding to the transmission area TA (see FIG. 3) of the cover window CW (see FIG. 3) described above. The flat portion MP of the window WP may be a flat portion.

The flat portion MP of the window WP may be a portion having a first thickness $t_{WP}$. The first thickness $t_{WP}$ of the flat portion MP of the window WP manufactured through the method of manufacturing a window according to an embodiment may be a distance between a flat upper surface MP-U and a flat lower surface MP-B facing away from each other.

The thickness of the preliminary window P-WP (see FIG. 6A) and the thickness of the window WP may have a relationship represented by Equation 1 below.

$$t_{WP} = t_{P\text{-}WP} - (2W_{RA})$$  Equation 1

In Equation 1 above, $W_{RA}$ indicates a first distance spaced apart from the edge P-ED of the preliminary window P-WP (see FIG. 6A), $t_{P\text{-}WP}$ indicates a thickness of the preliminary window P-WP, and $t_{WP}$ indicates a thickness of the flat portion MP.

The thickness $t_{WP}$ of the flat portion MP of the window may be less than the thickness $t_{P\text{-}WP}$ of the preliminary window P-WP before wet etching. The thickness $t_{WP}$ of the flat portion MP of the window manufactured in which the upper surface US and the lower surface BS of the preliminary window P-WP (see FIG. 6A) are etched with an etching solution through wet etching may become less than the thickness $t_{P\text{-}WP}$ of the preliminary window P-WP.

That is, in the window WP according to an embodiment, the flat portion thickness $t_{WP}$ may be reduced by a thickness corresponding to about twice the distance $W_{RA}$ from the edge P-ED of the preliminary window P-WP to the portion irradiated with the second laser light, from the thickness of the preliminary window $t_{P\text{-}WP}$.

In the window WP according to an embodiment, the edge portion side surface ED may be a portion spaced apart from the edge P-ED of the preliminary window at the first distance $W_{RA}$. The first distance $W_{RA}$ may correspond to the distance at which a portion irradiated with the second laser light, which is described with reference to FIG. 6A, is spaced apart from the edge P-ED of the preliminary window.

Portion "RA" in FIG. 9A may be a portion removed through wet etching when processed into the window WP in the preliminary window P-WP (see FIG. 6A). The edge portion EP of the window WP processed and provided through wet etching may include an edge upper surface EL-U and an edge lower surface EL-B facing away from each other. The edge portion EP of the window WP according to an embodiment is disposed at a side of the flat portion MP and may be a portion defined to have the edge upper surface EL-U, the edge lower surface EL-B, and the edge portion side surface ED. The edge portion EP of the window WP may have a chamfer shape in which a thickness is smaller in a direction spaced apart from the flat portion MP. The edge portion EP having such a chamfer shape may have improved strength characteristics compared to an edge portion processed at a right angle.

The exposed edge portion side surface ED of the edge portion EP may include a laser irradiation line LCL. The laser irradiation line LCL may be formed to extend in the third directional axis DR3, which is the thickness direction. In the window WP according to an embodiment, the laser irradiation line LCL may be a portion corresponding to the portion irradiated with the second laser light LL2 shown in FIG. 6A.

The laser irradiation line LCL is shown in the form of a line extending in the thickness direction in images shown in FIG. 10B and the like, but embodiments are not limited to the images shown in FIG. 10B or the like. The thickness, distance, length, etc., of the laser irradiation line LCL may vary according to energy level, beam size, a number of irradiations of the second laser light, etc., of the provided second laser light.

In an embodiment, the laser irradiation line LCL formed through the second laser light may be in the form of a groove formed in the edge portion side surface ED. However, embodiments of the inventive concept are not limited thereto.

The edge upper surface EL-U of the edge portion EP may include a curved surface concave in a direction toward the edge lower surface EL-B, and the edge lower surface EL-B may include a curved surface concave in a direction toward the edge upper surface EL-U. In an embodiment, the edge upper surface EL-U and the edge lower surface EL-B may be symmetrical with respect to a virtual line IML passing through a center of the edge portion side surface ED. However, embodiments are not limited thereto, and the edge upper surface EL-U and the edge lower surface EL-B of the edge portion EP may be asymmetrical.

However, embodiments are not limited thereto, and the shape of the edge portion EP may vary according to energy of applied second laser light, concentration of an etching solution provided in wet etching, and immersion time in the etching solution.

The width $W_{PA}$ of the edge portion EP in the direction of the first directional axis DR1 may be less than or equal to the first distance $W_{RA}$. For example, the width $W_{PA}$ of the edge portion EP in the direction of the first directional axis DR1 may be the same as the first distance $W_{RA}$. However, embodiments are not limited thereto, and the width $W_{PA}$ of the edge portion may vary according to the concentration of the etching solution provided in wet etching, the immersion time in the etching solution, and the like.

FIG. 9A and the like show that the edge portion EP is respectively disposed on both sides of the flat portion MP with the flat portion MP therebetween, but embodiments are not limited thereto, and the edge portion EP may be disposed only on one side of the flat portion MP. In addition, although not shown, the edge portions EP of the four surfaces of the window WP may all have the shape of the edge portion EP of the window according to an embodiment described above.

Figure 11A:
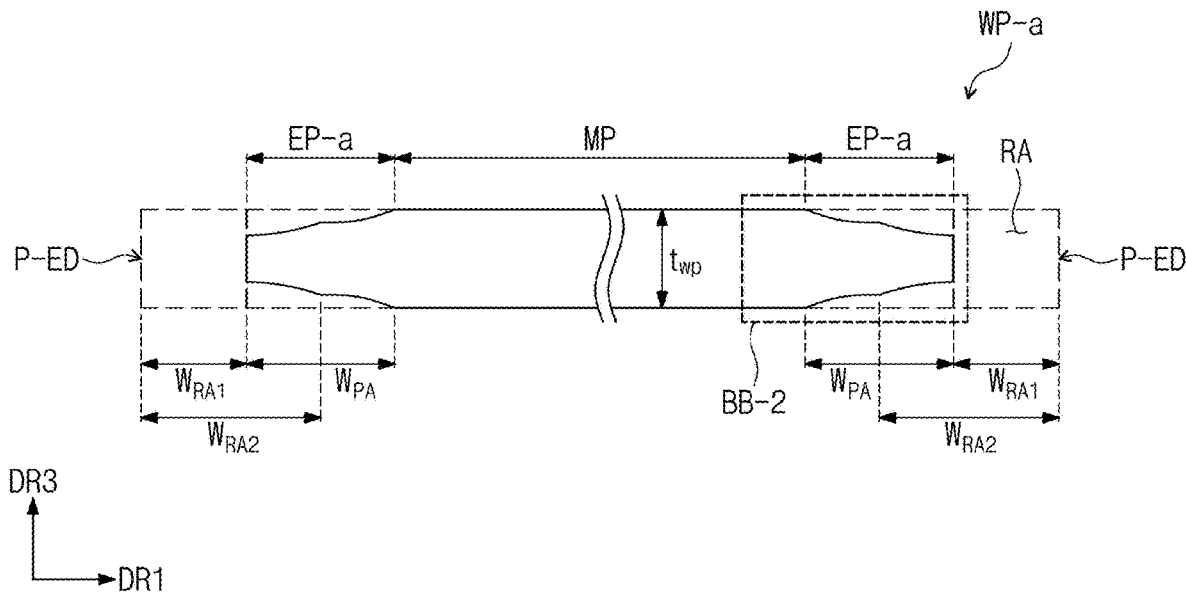
FIG. 11A is a cross-sectional view showing a window according to an embodiment.
Figure 11B:
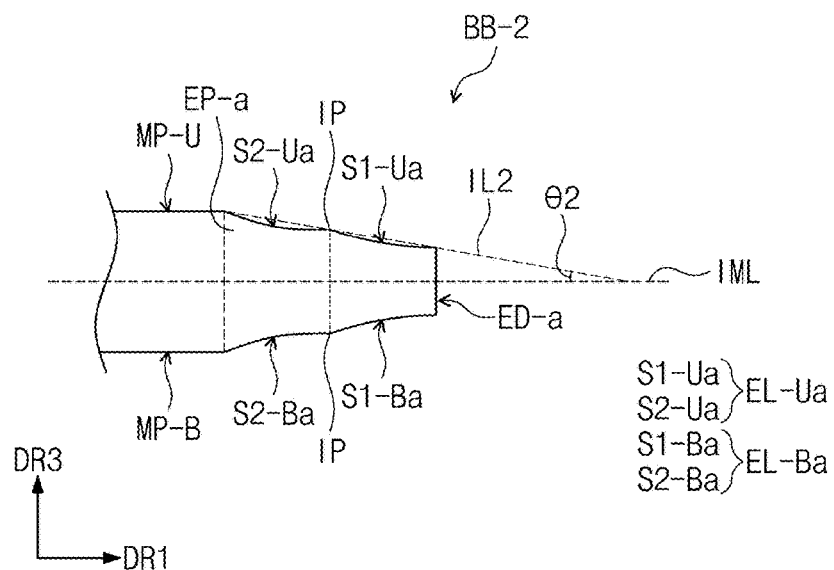
FIG. 11B is a cross-sectional view showing a region "BB-2" of the window of FIG. 11A.

FIGS. 11A and 11B are cross-sectional views showing a window WP-a according to an embodiment manufactured by wet etching a preliminary window irradiated with second laser light. FIG. 11B is an enlarged cross-sectional view showing a region "BB-2" of FIG. 11A. FIGS. 11A and 11B are views showing an embodiment of a window manufactured from the preliminary window P-WP shown in FIGS. 7A and 7B described above. The window WP-a of an embodiment shown in FIGS. 11A and 11B is different from the window WP according to the embodiment described with reference to FIGS. 9A to 10B only in the shape of an edge portion, and herein, in the description of the window WP-a according to an embodiment, descriptions of features described above will not be repeated, and differences will be mainly described.

The flat portion MP of the window WP-a may be a portion having a flat shape, and the edge portion EP-a may be a portion having a chamfer shape with a decreasing thickness in a direction away from the flat portion MP.

The flat portion MP of the window WP-a may be a portion having a first thickness $t_{WP}$. The first thickness $t_{WP}$ of the flat portion MP of the window WP-a manufactured through the method of manufacturing a window according to an embodiment may be the distance between a flat upper surface MP-U and a flat lower surface MP-B facing away from each other. The thickness of the preliminary window P-WP shown in FIG. 7A and the thickness of the window WP-a may satisfy the relationship of Equation 1 described with reference to FIGS. 9A and 9B.

Referring to FIGS. 11A to 11B, the window WP-a manufactured by wet etching the preliminary window irradiated with the second laser light may include a flat portion MP and an edge portion EP-a. The edge portion EP-a may be disposed at an outer side of the flat portion MP. In the window WP-a according to an embodiment, the edge portion EP-a may include a plurality of sub curved surfaces having different radii of curvature.

The edge portion EP-a of the window WP-a according to an embodiment may include an edge upper surface EL-Ua and an edge lower surface EL-Ba disposed between an edge portion side surface ED-a and the flat portion MP, and facing away from each other. The edge upper surface EL-Ua may include a curved surface concave in a direction toward the edge lower surface EL-Ba, and the edge lower surface EL-Ba may include a curved surface concave in a direction toward the edge upper surface EL-Ua.

The edge upper surface EL-Ua may include a first sub upper surface S1-Ua and a second sub upper surface S2-Ua, and the edge lower surface EL-Ba may include a first sub lower surface S1-Ba and a second sub lower surface S2-Ba. For example, the edge upper surface EL-Ua may include the first sub upper surface S1-Ua and the second sub upper surface S2-Ua, which have different radii of curvature, and the edge lower surface EL-Ba may include the first sub lower surface S1-Ba and the second sub lower surface S2-Ba, which have different radii of curvature. The edge upper surface EL-Ua and the edge lower surface EL-Ba may each include an inflection portion IP.

The exposed edge portion side surface ED-a of the edge portion EP-a may include a laser irradiation line. The laser irradiation line LCL (see FIG. 10B) may be formed to extend in the third directional axis DR3, which is the thickness direction. In the window WP-a according to an embodiment, the laser irradiation line LCL formed on the edge portion side surface ED-a may be a portion corresponding to a portion of the laser irradiation line LCL2 irradiated with the second laser light LL2 shown in FIG. 7A.

In an embodiment, the width $W_{P4}$ of the edge portion EP-a in the direction of the first directional axis DR1 may be less than or equal to the second distance $W_{RA2}$. However, embodiments are not limited thereto, and the width $W_{P4}$ of the edge portion may vary according to a concentration of an etching solution provided in wet etching, immersion time in the etching solution, and the like.

The edge portion EP-a of the window WP-a according to an embodiment shown in FIGS. 11A and 11B may have a gentler inclination degree than the window WP of the embodiment described with reference to FIGS. 9A and 9B. That is, the inclination of the edge portion EP-a may be gently processed when points irradiated with the second laser light provided for processing the edge portion increase.

Referring to FIGS. 9B and 11B, a first inclination angle 61 formed between the virtual line IML passing through the center of the edge portion side surface ED and a virtual line IL1 connecting the edges of the upper edge surface EL-U in the window WP of an embodiment may be greater than a second inclination angle 62 formed between the virtual line IML passing through the center of the edge portion side surface ED-a and a virtual line IL2 connecting the edges of the upper edge surface EL-Ua in the window WP-a according to an embodiment.

That is, the method of manufacturing a window according to one or more embodiments may be used to manufacture a window having an edge portion shape by adjusting a point irradiated with second laser light, irradiation energy of the second laser light, a number of irradiations of the second laser light, etc., after laser cutting.

The method of manufacturing a window according to one or more embodiments includes laser cutting, irradiating using laser light having energy lower than the energy used in the cutting, and wet etching the glass irradiated with the laser light to provide a window, which are sequentially performed, and a window having a chamfer-shaped edge portion may thus be easily manufactured.

That is, the method of manufacturing a window according to one or more embodiments of the inventive concept facilitates wet etching by irradiating, with laser light, near an edge portion that requires processing before the wet etching, and, accordingly, the edge portion has a chamfered shape without separate shape processing after the wet etching, thereby improving economic efficiency of the process.

A window according to one or more embodiments includes a flat portion and an edge portion disposed at an outer side of the flat portion and having a decreasing thickness in a direction away from the flat portion, and may thus exhibit excellent strength even at the edge portion.

According to one or more embodiments, a method of manufacturing a window, which is a method of easily manufacturing a window having a chamfer-shaped edge by irradiating using laser light having lower energy than that of laser light in laser cutting, and then performing wet etching, is provided.

A window according to one or more embodiments may have an improved strength at an edge portion by processing the edge portion to be chamfer-shaped.

Although the inventive concept has been described with reference to some embodiments of the inventive concept, it is to be understood that the inventive concept is not limited to these embodiments, but various changes and modifications can be made by those skilled in the art without departing from the spirit and scope of the inventive concept.

Accordingly, the technical scope of the inventive concept is not intended to be limited to the contents set forth in the detailed description of the specification, but is intended to be defined by the claims.

What is claimed is:

1. A method of manufacturing a window, the method comprising:
   laser cutting a base glass into a preliminary window, using first laser light;
   irradiating, with second laser light, a point spaced apart from an edge of the preliminary window at a first distance; and
   providing a window comprising a flat portion and an edge portion by wet etching the preliminary window irradiated with the second laser light,
   wherein the edge portion comprises an edge portion side surface formed from the second laser light and comprising a laser irradiation line extending in a thickness direction of the window.

2. The method of claim 1, wherein the first laser light has greater energy than the second laser light.

3. The method of claim 2, wherein the energy of the second laser light is about 50% to about 80% of the energy of the first laser light.

4. The method of claim 1, wherein the first laser light and the second laser light are infrared laser light.

5. The method of claim 1, wherein the first laser light and the second laser light each has a beam size of about 1 μm to about 5 μm.

6. The method of claim 1, wherein the first distance is about 10% to about 20% of a thickness of the preliminary window.

7. The method of claim 6, wherein the thickness of the preliminary window is about 20 μm to about 50 μm.

8. The method of claim 6, wherein the first distance is about 2 μm to about 5 μm.

9. The method of claim 1, wherein the edge portion is at an outer side of the flat portion, and has a decreasing thickness in a direction away from the flat portion.

10. The method of claim 1, wherein the providing the window comprises wet etching such that the edge portion comprises an edge upper surface and an edge lower surface facing away from each other, the edge upper surface comprising a curved surface concave in a direction toward the edge lower surface, and the edge lower surface comprising a curved surface concave in a direction toward the edge upper surface.

11. The method of claim 1, wherein the second laser light irradiation comprises irradiating, with the second laser light, a first portion spaced apart from the edge of the cut preliminary window at the first distance, and a second portion spaced apart from the edge of the preliminary window at a second distance.

12. The method of claim 11, wherein the providing the window comprises wet etching such that the edge portion comprises an edge upper surface and an edge lower surface facing away from each other, the edge upper surface comprising a first sub upper surface and a second sub upper surface that are concave in a direction toward the edge lower surface and have different radii of curvature, and the edge lower surface comprising a first sub lower surface and a second sub lower surface that are concave in a direction toward the edge upper surface and have different radii of curvature.

13. A method of manufacturing a window, the method comprising:
    laser cutting a base glass into a preliminary window, using first laser light;
    irradiating, with second laser light, a point spaced apart from an edge of the preliminary window at a first distance; and
    providing a window comprising a flat portion and an edge portion by wet etching the preliminary window irradiated with the second laser light,
    wherein a thickness of the preliminary window and a thickness of the window have a relationship according to the following Equation 1:

$t_{WP}=t_{P\text{-}WP}-(2W_{RA})$, where, in Equation 1, $W_{RA}$ indicates the first distance, $t_{P\text{-}WP}$ indicates the thickness of the preliminary window, and $t_{WP}$ indicates a thickness of the flat portion.

14. A method of manufacturing a window, the method comprising:
    laser cutting a base glass into a preliminary window, using first laser light;
    irradiating, with second laser light, a point spaced apart from an edge of the preliminary window at a first distance; and
    providing a window comprising a flat portion and an edge portion by wet etching the preliminary window irradiated with the second laser light,
    wherein a width of the edge portion is less than the first distance.

* * * * *